March 17, 1959 W. MASNIK ET AL 2,877,653
PISTON DRIVING MECHANISM AND LUBRICATING MEANS THEREFOR
Filed March 4, 1955 4 Sheets-Sheet 4

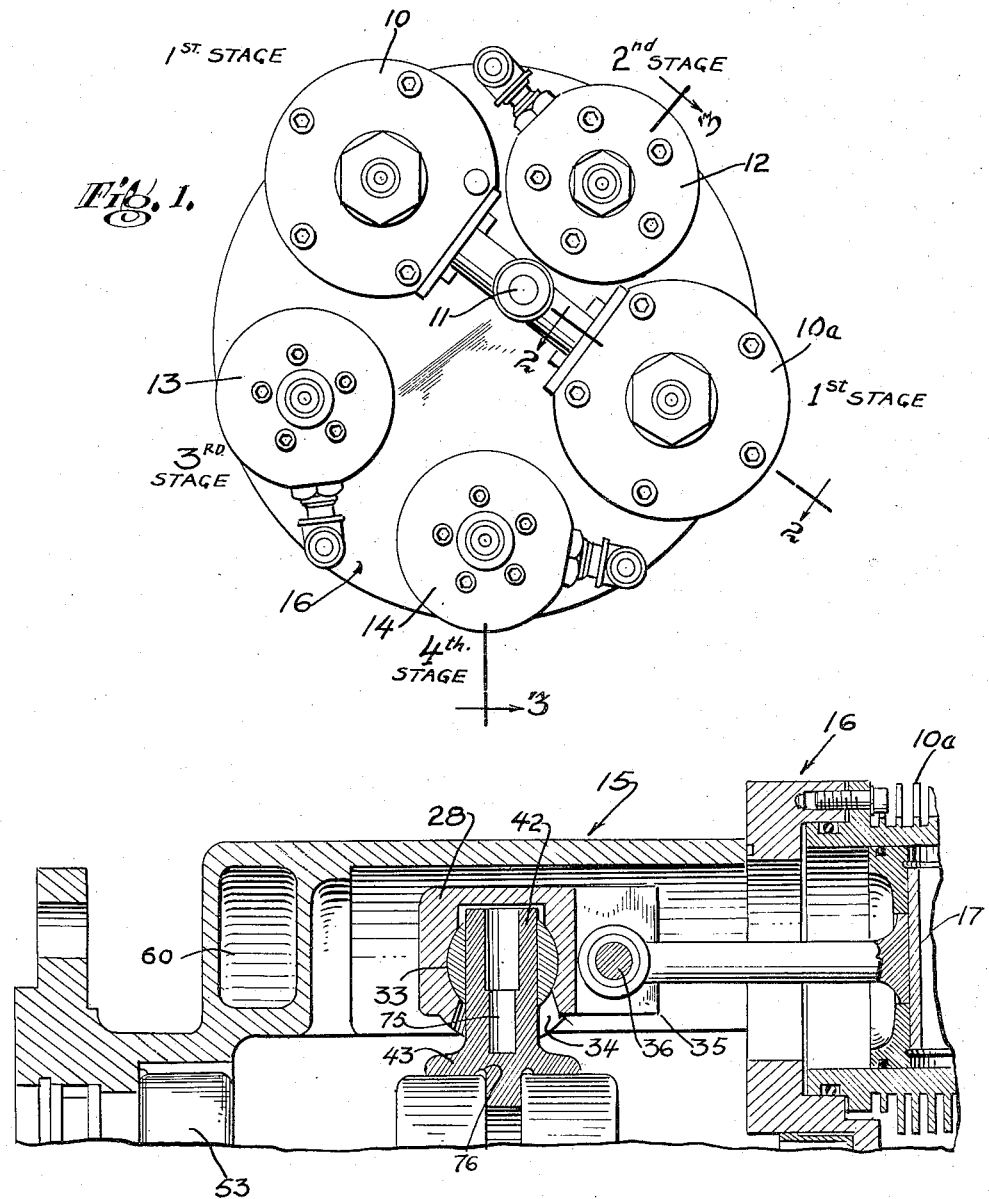

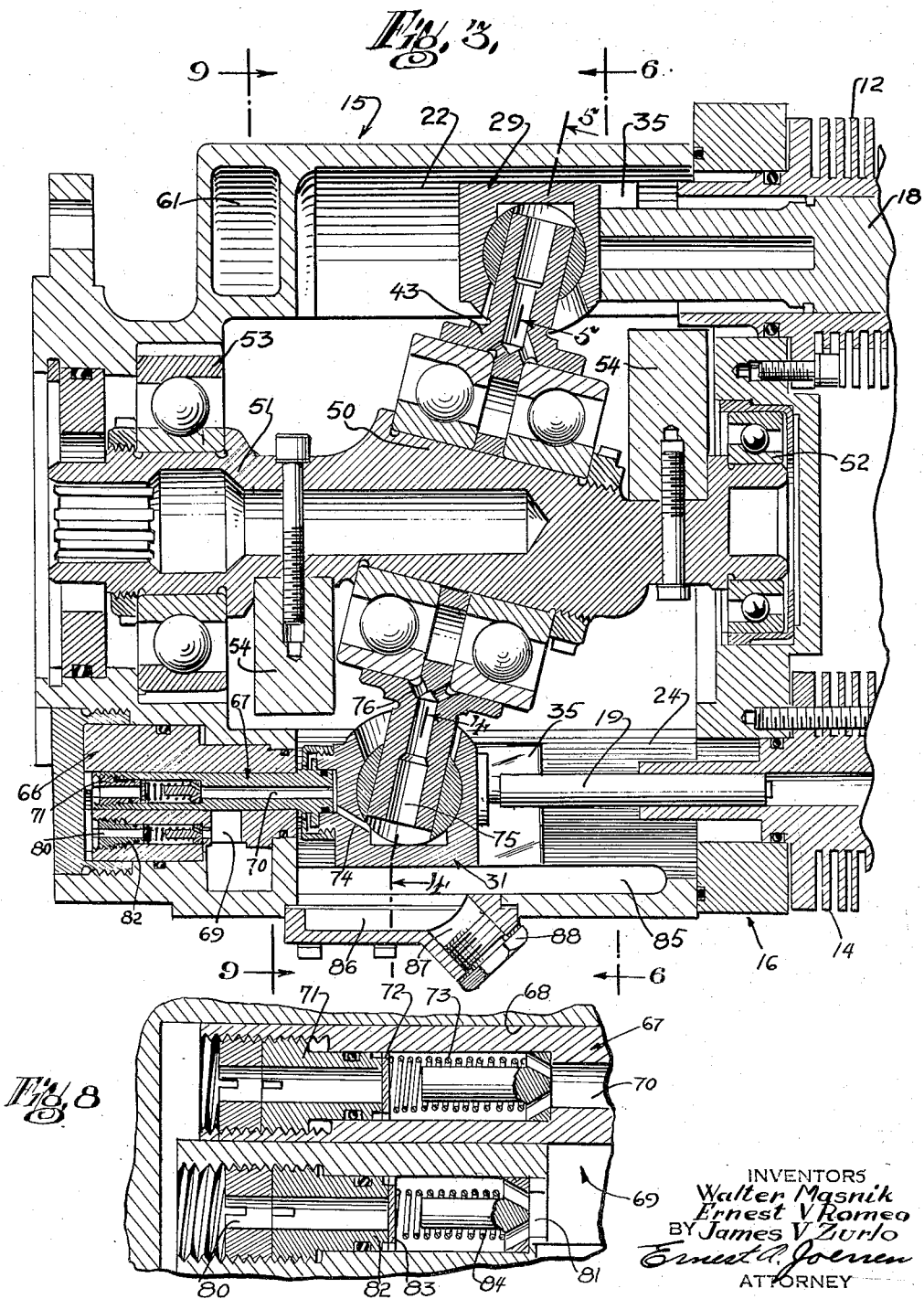

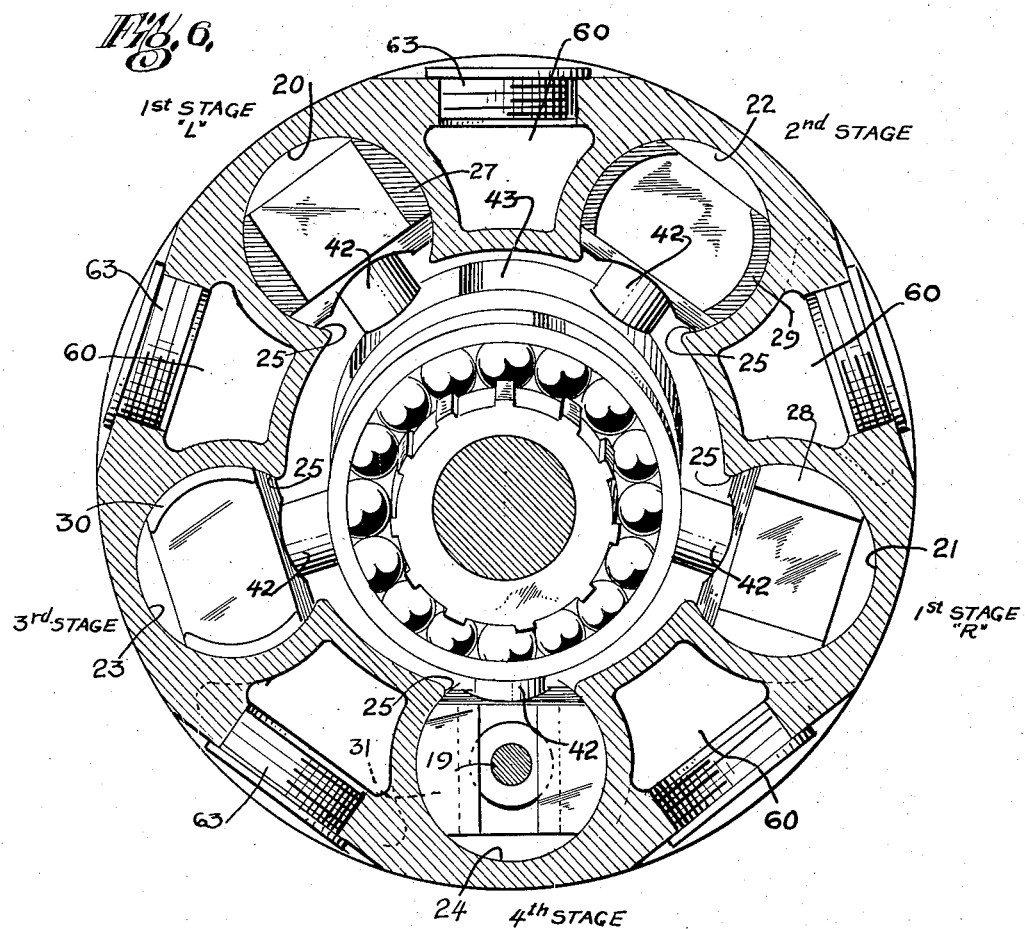
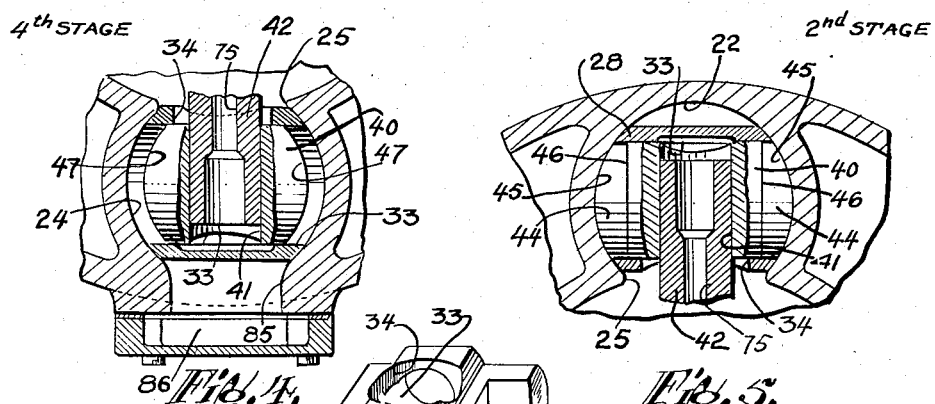
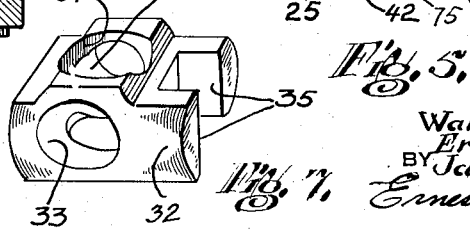

INVENTORS,
Walter Masnik
Ernest V. Romeo
BY James V. Zurlo
Ernest A. Joerren
ATTORNEY United States Patent Office 2,877,653
Patented Mar. 17, 1959

2,877,653

PISTON DRIVING MECHANISM AND LUBRICATING MEANS THEREFOR

Walter Masnik, Perth Amboy, Ernest V. Romeo, Lyndhurst, and James V. Zurlo, Belleville, N. J., assignors to Specialties Development Corporation, Belleville, N. J., a corporation of New Jersey Application March 4, 1955, Serial No. 492,076

6 Claims. (Cl. 74—60)

The present invention relates to machine elements and mechanisms, and, more particularly to a mechanical movement of the wabbler, starplate or swash-ring type adapted for use in connection with multi-stage gas or air compressors and the like.

Mechanical movements of the foregoing character generally comprise a housing having a plurality of circumferentially spaced axial guideways, a shaft journalled for rotation in the housing having a cranked section, slides for the guideways adapted to drive or be driven by a piston, a spider on the cranked section adapted to be wabbled thereby, and bearings connecting the arms of the spider to the slides.

Accordingly, an object of the present invention is to provide such mechanism wherein a novel and improved bearing arrangement connects the slides and the spider.

Another object is to provide such mechanism equipped with a novel and improved lubricating system for the spider end bearings.

Another object is to provide such mechanism wherein the housing is formed with a novel and improved lubricant reservoir.

Another object is to provide such mechanism wherein a novel and improved pump transfers the lubricant from the reservoir into the lubricating system.

Another object is to provide such mechanism which is relatively simple and economical in construction.

A further object is to provide such mechanism which can withstand continued operation at high speeds and under heavy loads for long periods of time.

Other and further objects of the invention will be obvious upon an understanding of the illustrative embodiment about to be described, or will be indicated in the appended claims, and various advantages not referred to herein will occupy to one skilled in the art upon employment of the invention in practice.

A preferred embodiment of the invention has been chosen for purposes of illustration and description, and is shown in the accompanying drawings, forming a part of the specification, wherein:

Fig. 1 is an end view of a compressor embodying the present invention.

Fig. 2 is a fragmentary sectional view taken along the line 2—2 on Fig. 1.

Fig. 3 is a fragmentary sectional view taken along the line 3—3 on Fig. 1.

Fig. 4 is a fragmentary sectional view taken along the line 4—4 on Fig. 3.

Fig. 5 is a fragmentary sectional view taken along the line 5—5 on Fig. 3;

Fig. 6 is a sectional view taken along the line 6—6 on Fig. 3.

Fig. 7 is a perspective view of one of the axial slides apart from other structure of the compressor.

Fig. 8 is an enlarged fragmentary view of the lubricant pump as shown in Fig. 3.

Figure 9:
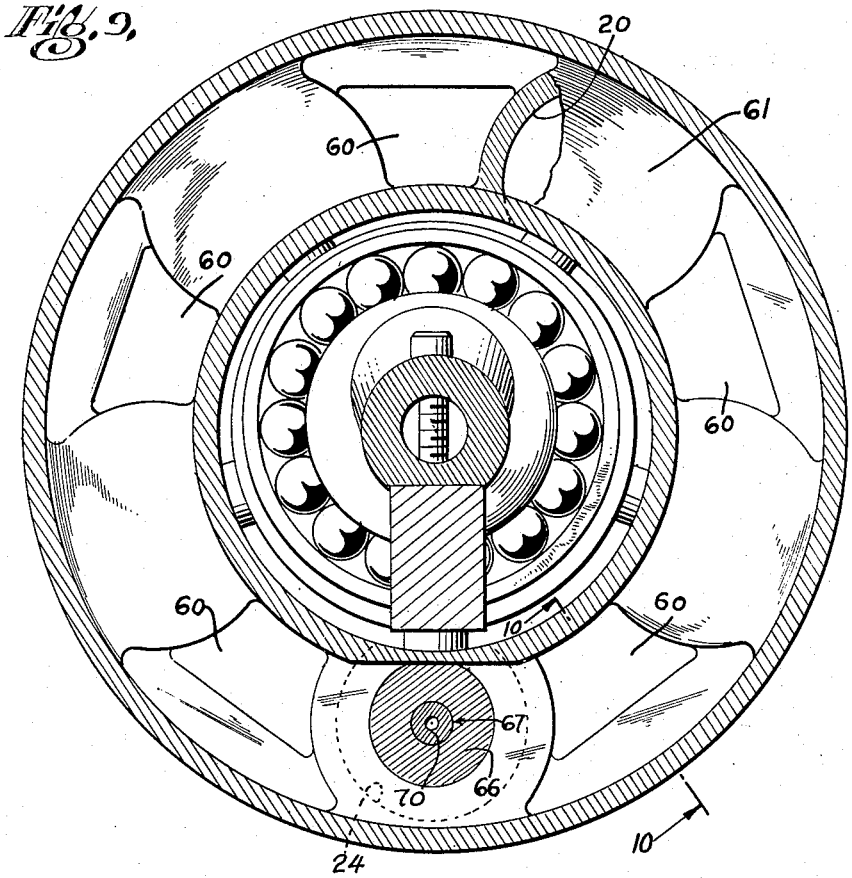
Fig. 9 is a sectional view taken along the line 9—9 on Fig. 3.

Referring to the drawings in detail and more particularly to Figs. 1 to 3, an air compressor of the multi-stage type is shown by way of example which has five circumferentially spaced cylinder and piston assemblies herein arranged to provide two identical first stage compression cylinders 10 and 10a having a common air intake 11, a second stage compression cylinder 12, a third stage compression cylinder 13, and a fourth stage compression cylinder 14, the air intake and exhaust valving and the connections between the respective stages of compression not being shown.

The compressor has a housing which comprises a generally cylindrical casing 15 having end openings, and a closure plate 16 for the opening at the right (as viewed in Fig. 3) having openings in which the cylinders are mounted with the cylinder bores facing the interior of the housing for the reception of pistons adapted to be operated by mechanism within the housing as described hereinafter.

A portion of a first stage piston 17 is shown in Fig. 2, and at least portions of second and fourth stage pistons or plungers 18 and 19 are shown in Fig. 3. The other first stage piston is similar to the piston 17, and the third stage piston plunger is similar to the plunger 19. These pistons and plungers are slidably disposed in their respective cylinder and are each provided with a connecting rod section which extends into the interior of the housing.

The casing 15 has five circumferentially spaced axially extending guideways 20, 21, 22, 23 and 24 at its inner wall facing the cylinders 10, 10a, 12, 13 and 14, respectively. These guideways are generally circular in cross-section (Figs. 4 to 6) and are each formed with an axial slot 25 facing the longitudinal axis of the casing. Axial slides 27, 28, 29, 30 and 31 are positioned in the guideways 20, 21, 23 and 24 respectively, which are substantially identical, except for the differences mentioned hereinafter.

As shown in Figs. 4 to 7, the sides 32 of the slides are contoured for slideable and rotary movement in the guideways by conforming the same to the curvature of the guideways, and have a generally circular transverse bore 33 extending through the sides, formed with an opening 34 facing the longitudinal axis of the casing at the slots 25. The end of the slides facing the cylinders is formed with spaced apart lugs 35 between which the free end of the connecting rod sections of the pistons or plungers is adapted to extend. These slides are reciprocated in the guideways by the mechanism described hereinafter to operate the plungers or pistons.

Preferably, at least one of the pistons is connected for positive movement with its slide in both directions. For example, as shown in Fig. 2, one of the first stage pistons 17 is so connected by means of a pin 36 extending through its connecting rod sections and the lugs 35 of the slide 28. The remaining slides, as illustrated in Fig. 3, have a flat face between their lugs for engaging the free ends of the connecting rod sections of the pistons associated therewith, whereby the pistons are pushed by the slides during the compression and follow the slides during the return stroke.

Each of the axial slides has a generally cylindrical cross-slide 40 mounted in its bore 33 for rotary movement therein which has a diametrically extending bore 41 facing the axial slide bore opening 34 for reception of an arm 42 of a spider 43 adapted to import the movement to the axial slides described hereinafter.

The cross-slides 40 are shorter than the bores 33 to normally allow them to move cross-wise therein, however one of the cross-slides 40, as shown in Fig. 5, is restrained against such movement. This is accomplished, by placing a button 44 at each end of the cross-slide which has an arcuate outer surface 45 contacting and conforming to the contour of the axial guideway and has a flat circular inner face 46 contacting corresponding end faces on the cross-slide 40 and serving as bearing means to enable the latter to rotate between the buttons 44. The remaining cross-slides 40, as illustrated in Fig. 4, have arcuate end faces 47 spaced from the axial guideway to mount these cross-slides for both cross-wise and rotary movement.

As shown in Figs. 3 and 6, a cranked section 50 of a drive shaft 51 is journalled for rotation in the spider 43, and the ends of the shaft 51 are respectively journalled for rotation by a bearing 52 in the plate 16 and a second bearing 53 at the opposite end of the housing, whereby the spider is wabbled upon rotation of the shaft 51. The shaft 51 has an end which extends outwardly beyond the bearing 53 which is adapted for connection to a power shaft (not shown).

A counter weight 54 is secured to the shaft 51 at the end adjacent the bearing 52, and a second counterweight is secured to the shaft at the end adjacent the bearing 53. As shown, the weights are spaced circumferentially about the shaft at an angle of about 180°. In this manner, the forces acting on the spider are maintained in better dynamic balance.

The bearing and slide arrangement for operating the pistons by means of the spider is lubricated by a system contained within and operated by the compressor. This system generally comprises a lubricant reservoir within the housing, passageway means associated with the spider and slide elements, and a pump operated by one of the slides for withdrawing lubricant from one of the slides and connected to the slide for forcing it into the passageway means.

Figure 10:
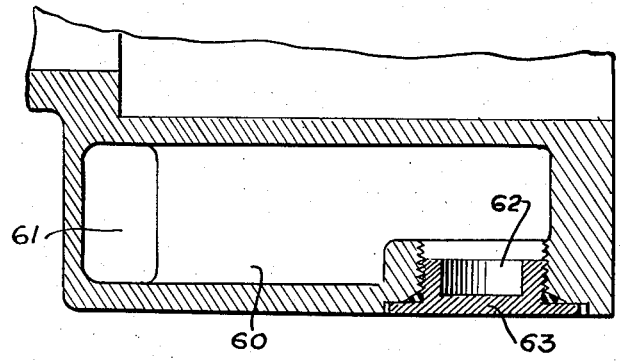
Fig. 10 is a fragmentary sectional view taken along the line 10—10 on Fig. 9.

As shown in Figs. 3, 6, 8, 9 and 10, the foregoing is accomplished by forming the interior of the casing 15 with a plurality of cells 60 circumferentially spaced and extending longitudinally between adjacent axial guideways and with an annular passageway 61 interconnecting the cells 60 to provide the reservoir. One or more of the cells 60, as illustrated in Fig. 10, may have an opening 62 for filling the reservoir, which opening normally is sealed by a plug 63 or has a fitting for connecting a lubricant supply line to the reservoir secured therein.

As shown in Figs. 3 and 8, the pump comprises a cylinder 66 mounted in a cavity formed in the casing 15 at the end opposite the plate 16, and a plunger 67 slideably mounted in the cylinder for reciprocation by one of the axial slides, for example, the slide 31 associated with the fourth stage of compression as illustrated herein.

The cylinder 66 has a longitudinal bore 68 facing the slide 31, and has a side opening 69 in communication with the reservoir passageway 61. The plunger 67 has a bore 70 extending therethrough and is coupled to the slide 31 for movement therewith.

A check valve is positioned in the bore of the plunger which comprises a seat member 71, a valve member 72, and a spring 73 for urging the valve member on its seat. When the plunger 67 is moved towards the right during the compression stroke of the fourth stage slide 31 (as viewed in Fig. 3), the valve member remains seated and the plunger at the end of this stroke uncovers the side opening 69 of the pump cylinder, whereby lubricant enters the left end of the cylinder. When the plunger is moved towards the left during the return stroke, pressure is applied on the lubricant within the pump cylinder and the lubricant unseats the valve member 72 and is forced through the plunger bore to the right end thereof which communicates with a passage 74 in the slide 31 extending into its transverse bore 33.

In order to distribute the lubricant so introduced the spider arms 42 have bores 75 and the spider has a circumferential passageway 76 which establishes intercommunication between all the bores 75 at the inner ends thereof, whereby lubricant is injected into all of the other slides 27, 28, 29 and 30 to lubricate the bearing surfaces associated therewith.

The supply of excessive quantities of lubricant, which would be forced between bearing surfaces within the slides and into the interior of the housing, is prevented by a by-pass or relief valve positioned adjacent the lubricant pump. This valve comprises an inlet 80 in communication with the left end of the cylinder bore 68, an outlet 81 in communication with the reservoir passageway 61, a valve seat 82 between the inlet and outlet, a valve member 83, and a spring 84 for normally holding the valve member on its seat but adapted to yield in response to an excessive pressure at the inlet side of the valve member to enable the latter to be unseated, whereby oil is by-passed from the cylinder bore to the reservoir.

Any lubricant which may be forced into the interior of the housing flows to the bottom thereof and can pass through a longitudinal slot 85 or other suitable opening in the axial guideway 24 (Figs. 3 and 4) to a well 86 formed with an opening 87 for receiving a plug 88 or a fitting for connecting the opening to a drainage line (not shown).

In operation of the compressor, the shaft 51 is rotated causing the spider to wabble and successively effect operation of the pistons of the various stages through a compression and a return stroke. During such movement, the axial slides are reciprocated in their guideways and the axial slides, other than the slide 28 (Fig. 2) which is positively connected to its piston connecting rod section, are free to rotate slightly within their guideways because of the generally circular surfaces of the axial slides and guideways; the cross-slides 40 are rocked back and forth in the transverse bores 33 and the cross-slides, other than the one fixed within its bore 33 by the buttons 44 can slide back and forth slightly in their bores 33; and the free ends of the spider arms 42 in bores 41 permit slight relative rotative movement between the cross-slides 40 and the spider arms. The foregoing bearing arrangement enables the ends of the spider arms to travel in a figure-8 path without restraint, whereby the bearing surfaces involved during such movement are not subjected to substantial forces inducing friction and surface wear and the useful life of the bearing elements is greatly prolonged. Such wear is further reduced by continually lubricating these surfaces by the operation of a pump which supplies the lubricant at a rate dependent on the speed of rotation of the shaft 51 which wabbles the spider.

From the foregoing description, it will be seen that the present invention provides a novel and improved mechanism of the type described herein which is useful in transferring rotary motion to reciprocating motion or vice versa in connection with compressors, pumps and engines.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:

1. In apparatus of the class described, a housing having a plurality of axially extending guideways spaced circumferentially with respect to each other, a shaft journalled for rotation in said housing with its axis of rotation centrally located between said guideways and having a cranked section, an axial slide for each of said guideways having a generally circular transverse bore formed with an opening facing the axis of rotation of said shaft, an axially slideable member operatively associated with each of said slides for operation therewith, a generally cylindrical cross-slide for each of said transverse bores having a diametrically extending bore therein, a spider having arms each extending through one of said axial slide openings and into one of said cross-slide bores, said spider having interconnected passageway means terminating in said cross-slide bores, means for centrally journalling said cranked section for rotation in said spider, a lubricant pump in said housing having an outlet, one of said axial slides being connected for operating said pump and having a passageway therein for establishing fluid flow communication between said pump outlet and its said transverse bore and the bore of said cross-slide therein, and a lubricant reservoir in said housing including a plurality of cells interconnected for fluid flow communication, each cell being located between a pair of adjacent guideways, said pump having an inlet in communication with said reservoir.

2. Apparatus according to claim 1, wherein said pump includes a cylinder in said housing and a plunger formed with said pump outlet in said cylinder and connected for operation by said last described axial slide.

3. Apparatus according to claim 2, wherein said pump cylinder has valve means for controlling said pump inlet and outlet.

4. Apparatus according to claim 1, wherein journalling means include bearing means and said spider passageway means are constructed and arranged to supply lubricant to said bearing means.

5. In apparatus of the class described, a housing, a plurality of axial slides in said housing each adapted to operate an axially slideable piston at one end thereof and one of said slides having an aperture at its opposite end, means including a spider formed with passageway means for establishing fluid flow communication between said slides and said aperture, a lubricant reservoir in said housing, a cylinder adjacent said reservoir having an opening at one end facing said slide formed with said aperture and having a side opening in communication with said reservoir, a piston in said cylinder formed with a bore in communication with said aperture and connected to said slide facing said cylinder end opening for reciprocation thereby to close and unclose said cylinder side opening, and a valve in said piston bore for controlling the pumping of lubricant by said piston into said slide aperture.

6. Apparatus according to claim 5, including a relief valve adjacent said cylinder having an inlet in communication with said cylinder adjacent the end opposite the end facing said slide and having an outlet in communication with said reservoir.

References Cited in the file of this patent
UNITED STATES PATENTS

| | | |
|---|---|---|
| 1,370,927 | Staude | Mar. 8, 1921 |
| 2,104,391 | Redrup | Jan. 4, 1938 |
| 2,112,934 | Stinnes | Apr. 5, 1938 |
| 2,337,821 | Huber | Dec. 28, 1943 |
| 2,570,698 | Manseau | Oct. 9, 1951 |
| 2,583,564 | Hall | Jan. 29, 1952 |